INVENTOR.
Earl H Hurley
BY
Ralph Hamman
Attorney

April 4, 1967 E. H. HURLEY 3,312,409

APPARATUS FOR REVIEWING PERFORATED TAPE FOR TYPESETTING MACHINES

Filed March 5, 1965 2 Sheets-Sheet 2

INVENTOR.
Earl H Hurley
BY Ralph Hammar
Attorney

United States Patent Office 3,312,409

Patented Apr. 4, 1967

3,312,409

APPARATUS FOR REVIEWING PERFORATED TAPE FOR TYPESETTING MACHINES

Earl H. Hurley, 162 Maple Ave., Corry, Pa. 16407

Filed Mar. 5, 1965, Ser. No. 437,455
4 Claims. (Cl. 242—67.1)

Subscribers to news services receive the news on equipment which delivers perforated tape so that the stories can be set in type by tape controlled machines. The news is continually arriving and in greater quantity than any newspaper can use without editing. Each subscriber accordingly has the problem of reviewing the tape and selecting those portions which are to be set up in type and printed.

This invention is intended to store the incoming tape on reels, to rewind the stored tape to get it in proper sequence and to review the rewound tape to permit selection of those portions to be fed to automatic typesetting equipment.

Figure 1:
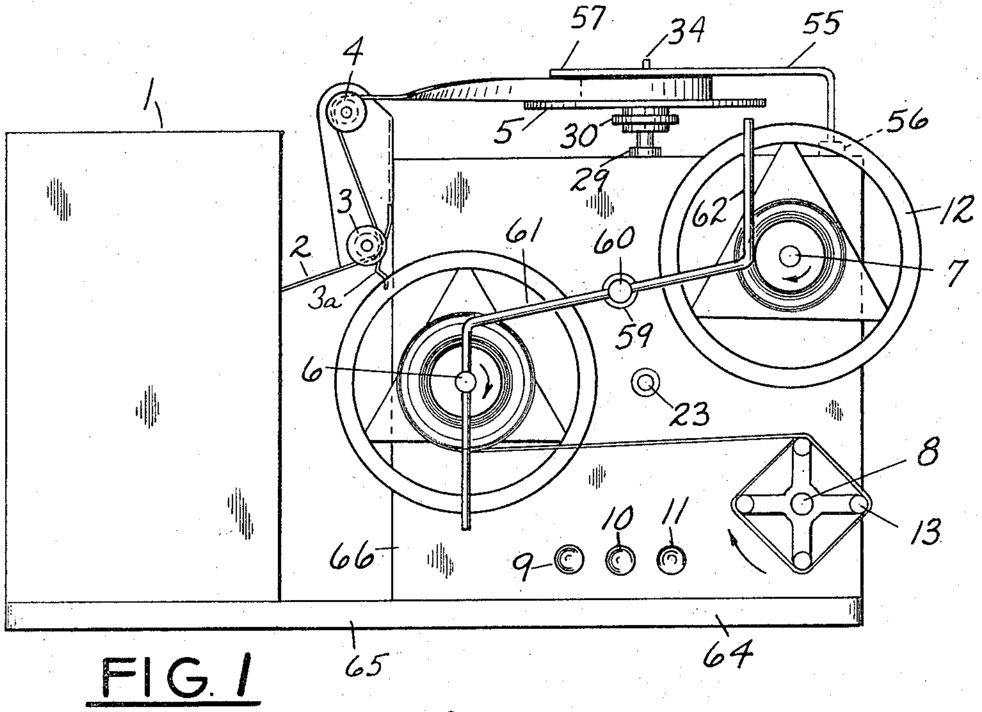
Figure 2:
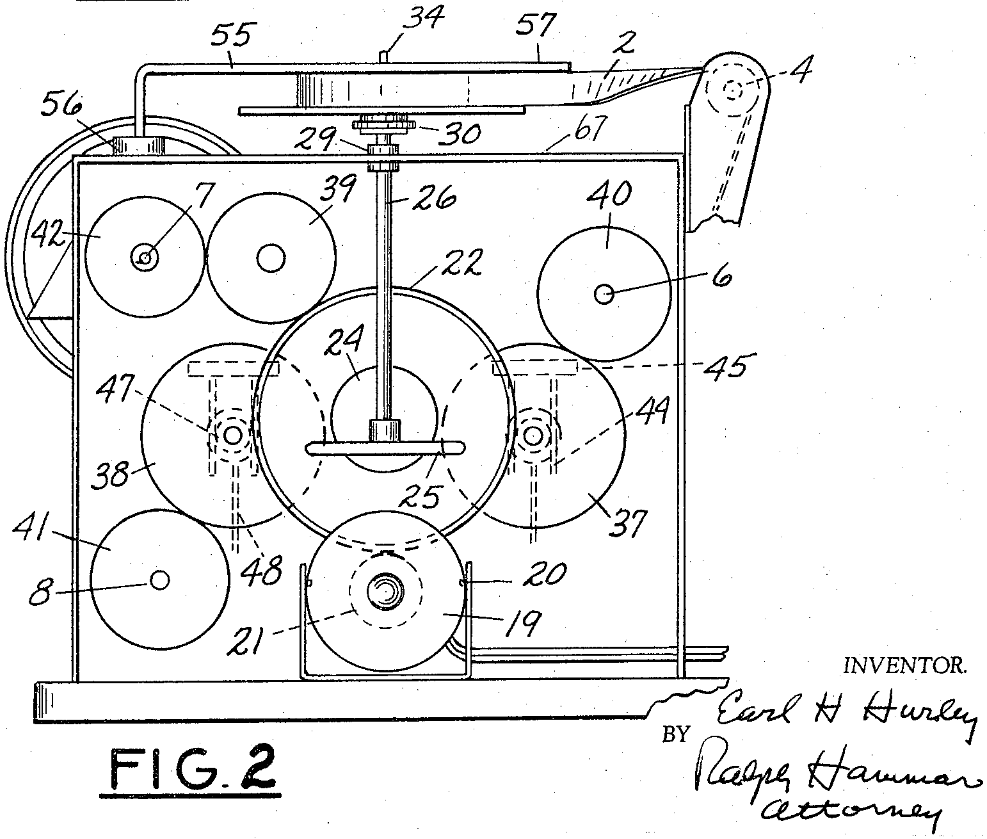
Figure 3:
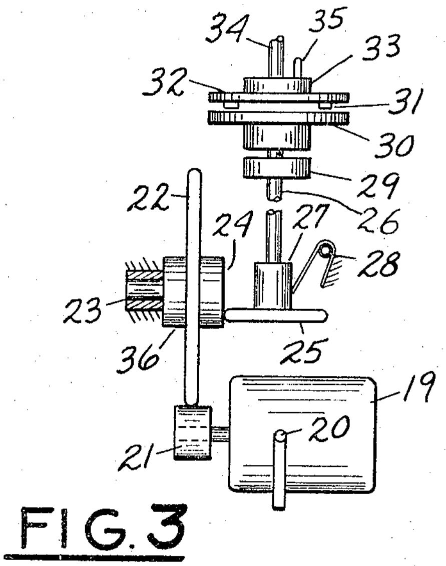
Figure 7:
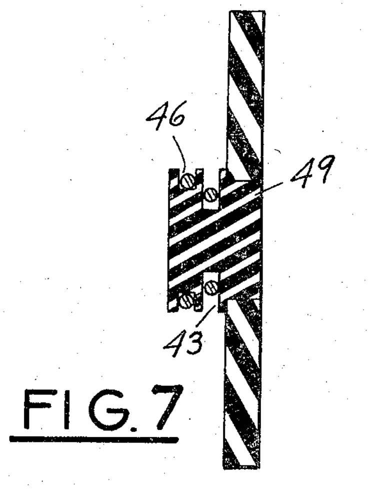
Figures 4, 6:
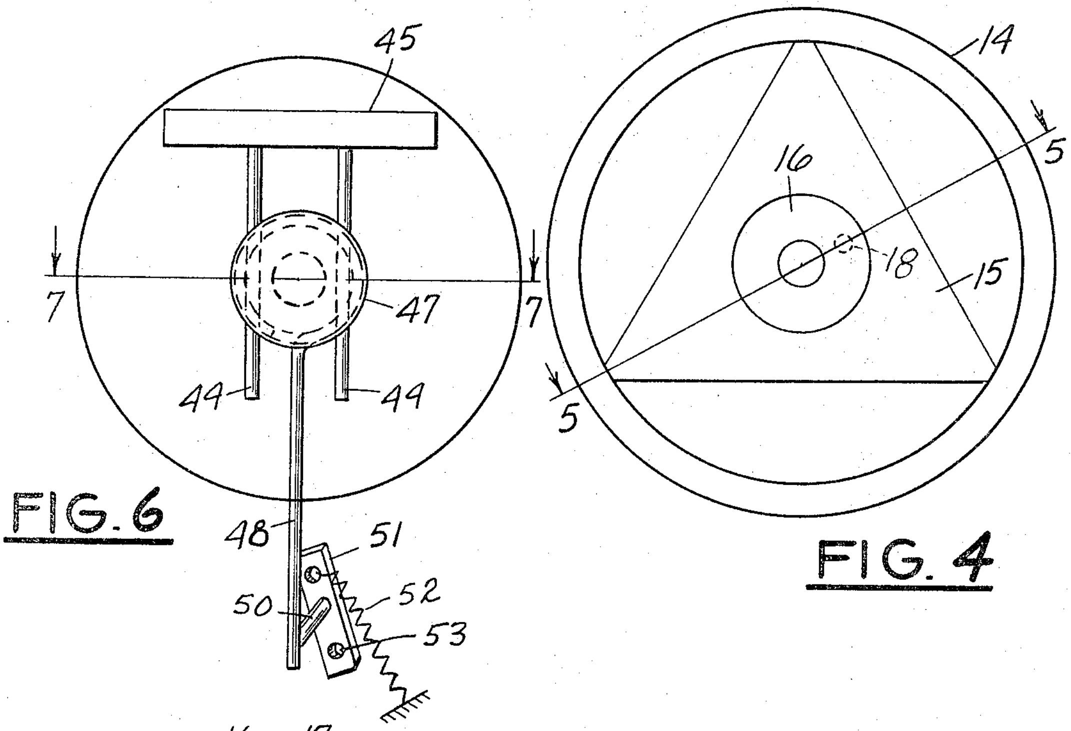
Figure 5:
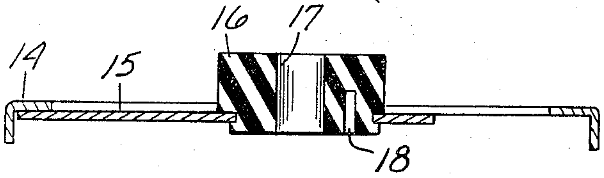

In the accompanying drawing, FIG. 1 is a front view of the apparatus and an associated perforated tape machine, FIG. 2 is a back view of the apparatus, FIG. 3 is a diagrammatic view of the drive for the take-up reel for the incoming tape, FIG. 4 is a top plan view of one of the reels, FIG. 5 is a section on line 5—5 of FIG. 4, FIG. 6 is an elevation of one of the friction drive elements, and FIG. 7 is a section on line 7—7 of FIG. 6.

In the drawing, 1 indicates the equipment which receives news from a wire service and delivers the news on perforated tape which can be fed to tape controlled typesetting equipment. The perforated tape 2 is delivered as the news stories are received and at periodic intervals the subscriber is confronted with the problem of reviewing the perforated tape and selecting that portion which is to be set up in type. For this purpose, the tape passes over flanged guides 3 and 4 to a substantially horizontal take-up reel 5 which is continuously driven by a slip clutch (shown in FIG. 3) capable of maintaining a continuous safe tension on the tape so that the tape is conveniently stored on the reel. The reel 5 has capacity to store a large quantity of tape so it can be left unattended for long intervals. A spring 3*a* bears on the tape passing over guide 3 and maintains the desired tension in the tape wound on reel 5. While changing reels, slack tape may accumulate ahead of the guide 3.

The stored tape wound on the reel 5 is in reverse sequence and must be rewound onto another reel before it can be reviewed. The rewound reel must then be wound on a take-up reel at a controlled speed so that the tape can be reviewed and the desired portions selected. For this purpose, there are three substantially horizontal spindles 6, 7 and 8 respectively controlled by clutch control knobs 9, 10 and 11. When the knobs are turned to the engaged or driving position, the associated spindle is driven in the same direction as the take-up reel 5.

For rewinding, the reel 5 is first mounted on the spindle 6 and a take-up reel 12 is mounted on the spindle 7. When the clutch control knob 10 is turned to the driving position, the spindle 7 drives the reel 12 in the same direction as reel 5 and the reel 5 mounted on spindle 6 turns freely so that its contents are wound on the reel 12. When rewound on the reel 12, the news stories are in proper sequence for reviewing.

For reviewing, the reel containing rewound tape is mounted on spindle 6 and one end of the tape is fastened to take-up reel 13 on spindle 8. By turning clutch control knob 11 to the driving position, the spindle 8 is driven at the desired speed for reviewing and as the tape is wound on the reel 13, the desired portions can be selected and torn off and fed to tape controlled typesetting equipment. If for any reason the editor wishes to reconsider a section of tape being reviewed, the knob 11 may be turned to the "off" position and the knob 9 to the "on" position, thereby rewinding the tape on the reel mounted on spindle 6. The editor has full control at all times and the tape is always conveniently stored on reels until the selected portions are removed for actual typesetting. When it is considered that the incoming volume of news greatly exceeds that which is to be set in type, it can be appreciated that the handling of the incoming tape presents a substantial problem.

Preferably the reels are of the construction shown in FIGS. 4 and 5 and comprise an annular rim 14 fixed to a spider 15 having at its center a hub 16 of nylon or other suitable plastic provided with a bore 17 rotatably receiving any one of the spindles and also provided with a drive socket 18 for providing a positive drive connection to the hub. The spider 15 provides only one side of the reel, the other side being open so that should the subscriber desire, large sections of tape may be removed from any one of the reels. This is an advantageous feature permitting quick disposal of outdated news.

The drive for the equipment as shown in FIGS. 2 and 3 comprises a motor 19 mounted on trunnions 20 located so that the weight of the motor urges the motor drive pulley 21 against the rim of a driven pulley 22 journaled in a bearing 23. The motor 19 runs continuously whenever the equipment is running. On the rear side of the pulley 22 is a friction drive hub 24 driving a pulley 25 fixed to the lower end of a vertical shaft 26. The shaft 26 is journaled in a bearing 27 urged by spring 28 toward the friction drive pulley 24 maintaining the desired contact between the pulleys 24 and 25. The upper end of the vertical shaft 26 is journaled in a bearing 29 having sufficient play to permit the required pivotal movement of the lower end of the shaft to maintain the friction drive between the pulleys 24, 25.

Fixed to the upper end of the shaft 26 is a clutch member 30 having on its upper face friction members 31. The driven clutch member 32 has a hub 33 journaled on the projecting upper end 34 of the shaft 26 which serves as a spindle for any one of the reels. The clutch member 32 has a projecting pin 35 which fits in the drive socket 18 of the reel mounted on spindle 34. When the reel is mounted on the spindle 34, its weight is transmitted to the clutch member 32 thereby establishing a driving connection to the reel which is proportional to the weight of the tape wound on the reel. The friction material 31 is designed to run substantially indefinitely in slipping engagement with the clutch member 32 so that if the reel is held stationary for long periods of time, as would be the case if no tape were coming out of the machine 1, no damage is done. The speed of the shaft 26 is greater than the speed of the machine 1 so as to take up any slack in the tape 2 which may occur while changing reels. The speed of shaft 26 is not so great as to damage the tape.

On the opposite side of the pulley 22 is an integral pulley 36 adapted to be engaged by idler pulleys 37 and 38. There is also an idler pulley 39 adapted to engage the rim of the pulley 22. When the idler pulley 37 is engaged with the pulley 36, a driving connection is established from the pulley 36 through the idler 37 to pulley 40 fixed on the spindle 6. This drive is a relatively slow speed drive in the same direction as the spindle 34. When the idler pulley 38 is engaged with the pulley 36, a drive is established to pulley 41 fixed to the spindle 8. This also is a slow speed drive and in the same direction as the spindle 34. When the idler pulley 39 engages the rim of the pulley 22, a drive is established to pulley 42 fixed to the spindle 7. Because of the relatively large diameter of the pulley 22 as compared to the pulley 36, this is a high speed drive. It is in the same direction as the spindle 34. The purpose of the high speed drive to the spindle 7 is to provide a fast rewind. The purpose of the slow speed drive to the spindle 8 is to provide a slow speed drive for reviewing or editing the tape. Each of the idler pulleys 37, 38, 39 is controlled by the associated knob 9, 11, 10 in a manner illustrated in FIGS. 6 and 7. The idler pulleys are of substantially identical construction, each having at its center a hub 49 with a groove 43 slidably receiving parallel rods 44 fixed to a supporting member 45 and having a groove 46 rotatably receiving the eye 47 of a conecting rod 48. At least the hub portion 49 of each idler pulley, that is, the portion containing the grooves 43 and 46, is made of bearing material such as nylon or other suitable plastic. The lower end of the connecting rod 48 is connected by a projection 50 to a crank 51 fixed to one of the knobs 9, 10, 11 as the case may be. An over-center spring 52 holds the crank 51 on either one or the other side of the pivot 53 for the associated knob.

By rotating the knob, the crank 51 is turned to reciprocate the connecting rod 48 and move the idler pulley into and out of engagement with the associated drive pulley. The over-center spring 52 holds the idler pulley either in driving or non-driving position, depending upon its relation to the pivot 53. When in driving relation, the over-center spring maintains the desired frictional contact.

Because the reels are open on one side, a guard is provided to maintain the tape centered on the hub 16 of the reel. A guard 55 pivoted in bearing 56 has an arm 57 extending over the open face reel 5. Another guard 59 pivoted in bearing 60 has arms 61 and 62 respectively extending over the open faces of the reels mounted on spindles 6 and 7. When the guard 59 is pivoted clockwise from the position shown in FIG. 1, the arms clear the reels and permit mounting or removal on the spindles 6 and 7. All of the guards have arms of sufficient resilience to lie against the reel hubs and hold the tape against the opposite side of the reel.

The apparatus is conveniently mounted in a cabinet on a base 64 having arms 65 fixed to the equipment 1. The front wall 66 of the cabinet carries bearings (not shown) for the spindles 6, 7, 8 and for the knobs 9, 10, 11. Bearing 23 for the pulley 22 and bearing 60 for the guard 59 are also mounted on the front wall of the cabinet. The top wall 67 of the cabinet carries the bearing 29 for the shaft 26 and bearing 56 for the guard 55. These bearings are preferably made of nylon or similar plastic requiring no lubrication.

What is claimed as new is:

1. Apparatus for storing, rewinding and reviewing perforated tape for tape controlled typesetting equipment comprising a friction clutch driving member having a substantially vertical spindle and an upwardly presented friction surface, a friction clutch driven member resting on and driven by said surface, a plurality of reels, each reel having a hub adapted to be telescoped over said vertical spindle and to rest on said driven member, said driven member and hub having separable positive driving connections and said hub being driven by a friction force from said friction surface proportional to the weight of the tape wound on the reel and thereby taking up and storing the tape as received, a plurality of substantially horizontal spindles each adapted to receive the hub of any one of said reels in telescoping relation and each having a separable positive driving connection mating with the driving connection of the associated hub, clutch means for selectively driving each of the horizontal spindles in the same direction as said vertical spindle whereby tape wound on a first reel may be rewound on a second reel to place the tape in proper sequence and may then be wound from a second reel to a third reel to permit review of the tape for selecting the portions to be fed to tape controlled typesetting equipment.

2. Apparatus for storing, rewinding and reviewing perforated tape for tape controlled typesetting equipment comprising a friction clutch driving member having a substantially vertical spindle and an upwardly presented friction surface, a friction clutch driven member resting on and driven by said surface, a plurality of reels, each reel having a hub adapted to be telescoped over said vertical spindle and to rest on said driven member, said driven member and hub having separable positive driving connections and said hub being driven by a friction force from said friction surface proportional to the weight of the tape wound on the reel and thereby taking up and storing the tape as received, a plurality of substantially horizontal spindles each adapted to receive the hub of any one of said reels in telescoping relation and each having a separable positive driving connection mating with the driving connection of the associated hub, a pulley drive means for driving each horizontal spindle in the same direction as the vertical spindle comprising a driving pulley, a driven pulley fixed to the horizontal spindle, and an idler pulley movable into and out of engagement with said driving and driven pulleys whereby tape wound on a first reel may be rewound on a second reel to place the tape in proper sequence and may then be wound from a second reel to a third reel to permit review of the tape for selecting the portions to be fed to tape controlled typesetting equipment.

3. Apparatus for storing, rewinding and reviewing perforated tape for tape controlled typesetting equipment comprising a friction clutch driving member having a substantially vertical spindle and an upwardly presented friction surface, a friction clutch driven member resting on and driven by said surface, a plurality of reels, each reel having a hub adapted to be telescoped over said vertical spindle and to rest on said driven member, said driven member and hub having separable positive driving connections and said hub being driven by a friction force from said friction surface proportional to the weight of the tape wound on the reel and thereby taking up and storing the tape as received, a plurality of substantially horizontal spindles each adapted to receive the hub of any one of said reels in telescoping relation and each having a separable positive driving connection mating with the driving connection of the associated hub, a pulley drive means for driving each horizontal spindle in the same direction as the vertical spindle comprising a driving pulley, a driven pulley fixed to the horizontal spindle, and an idler pulley movable into and out of engagement with said driving and driven pulleys, said idler pulley having a hub, a groove in said hub, spaced rods received in said groove, a connecting rod journaled on said idler pulley hub, and means including an overcenter spring for moving the idler pulley hub toward and away from the driving position.

4. Apparatus for storing, rewinding and reviewing perforated tape for typesetting comprising a support having front and top walls, a substantially vertical driven spindle projecting through the top wall, a friction clutch driving member fixed to the projecting end of said spindle and having an upwardly presented friction surface, a friction clutch driven member resting on and driven by said surface, a plurality of reels, each reel having a hub adapted to be telescoped over said vertical spindle and to rest on said driven member and be driven by a friction force from said friction surface proportional to the weight of the tape wound on the reel and thereby taking up and storing the tape as received, said driven member and hub having separable positive driving connections, a plurality of substantially horizontal spindles each projecting through said front wall and adapted to receive said hub in telescoping relation and each having a separable positive driving connection mating with the driving connection of the hub, means for selectively driving each of the horizontal spindles in the same direction as said vertical spindle whereby tape wound on the horizontal reel may be rewound on another reel to place the tape in proper sequence and may then be wound from said other reel onto a third reel to permit review of the tape to select the portions to be fed to tape controlled typesetting equipment, and a control knob for the drive for each horizontal spindle mounted in said front wall.

References Cited by the Examiner

UNITED STATES PATENTS

| | | | |
|---|---|---|---|
| 1,326,997 | 1/1920 | Uebelmesser | 242—55.12 |
| 2,169,143 | 8/1939 | Hardenberg | 242—67.1 |
| 2,882,788 | 4/1959 | Steigman | 242—55.11 X |

FRANK J. COHEN, *Primary Examiner.*

G. F. MAUTZ, *Assistant Examiner.*